(12) United States Patent
Kanishima et al.

(10) Patent No.: US 9,946,340 B2
(45) Date of Patent: Apr. 17, 2018

(54) ELECTRONIC DEVICE, METHOD AND STORAGE MEDIUM

(71) Applicant: Kabushiki Kaisha Toshiba, Minato-ku, Tokyo (JP)

(72) Inventors: Yasuhiro Kanishima, Tokyo (JP); Hiroaki Komaki, Tachikawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 299 days.

(21) Appl. No.: 14/674,417

(22) Filed: Mar. 31, 2015

(65) Prior Publication Data

US 2016/0132107 A1 May 12, 2016

Related U.S. Application Data

(60) Provisional application No. 62/076,304, filed on Nov. 6, 2014.

(51) Int. Cl.
*A61B 3/14* (2006.01)
*G06F 3/01* (2006.01)
(Continued)

(52) U.S. Cl.
CPC .......... *G06F 3/013* (2013.01); *G02B 27/0093* (2013.01); *G02B 27/017* (2013.01);
(Continued)

(58) Field of Classification Search
CPC .. G02B 27/0093; G02B 27/01; G02B 27/017; G02C 11/10; G02C 5/12; G08B 21/06;
(Continued)

(56) References Cited

U.S. PATENT DOCUMENTS

2010/0191140 A1* 7/2010 Terada ............... A61B 5/04842
600/544
2011/0178784 A1* 7/2011 Sato ..................... A61B 5/0496
703/2
(Continued)

FOREIGN PATENT DOCUMENTS

| JP | 2008-212718 A | 9/2008 |
| JP | 2012-247975 A | 12/2012 |
| JP | 2013-528871 A | 7/2013 |
| JP | 2013215356 A * | 10/2013 |

(Continued)

OTHER PUBLICATIONS

Hiroyuki Manabe, et al., "Using Earphones to Perform Gaze Detection for Wearable Interfaces," NTT DOCOMO Technical Journal, published Dec. 2010, vol. 12, No. 3, pp. 12-17, https://www.nttdocomo.co.jp/english/binary/pdf/corporate/technology/rd/technical_journal/bn/vo12_3/vo I12_3_012en.pdf.

(Continued)

*Primary Examiner* — Mustak Choudhury
(74) *Attorney, Agent, or Firm* — Knobbe Martens Olson & Bear LLP

(57) ABSTRACT

According to one embodiment, an eye-worn electronic device includes a first nose pad, a first electrode, a second nose pad, a second electrode and a third electrode. The first electrode is on the first nose pad. The second electrode is on the second nose pad. The first electrode and the second electrode are in a first straight line extending in a first direction and are used for measuring first ocular potentials in the first direction. The third electrode is on the second nose pad and is at a position distance away from the first straight line. The first electrode and the third electrode are in a second straight line extending in a second direction different from the first direction and are used for measuring second ocular potentials in the second direction.

16 Claims, 10 Drawing Sheets

(51) Int. Cl.
*G02C 11/00* (2006.01)
*G02B 27/01* (2006.01)
*G02B 27/00* (2006.01)
*G02C 5/12* (2006.01)

(52) U.S. Cl.
CPC .......... *G02B 27/0172* (2013.01); *G02C 11/10* (2013.01); *G06F 3/015* (2013.01); *G02B 2027/014* (2013.01); *G02B 2027/0178* (2013.01); *G02B 2027/0187* (2013.01); *G02C 5/12* (2013.01)

(58) Field of Classification Search
CPC .. A61B 3/10; A61B 3/113; A61B 5/16; A61B 5/0496; A61B 5/6844; G09G 5/00; G06F 1/325; G06F 3/015; G06F 1/3231; A61L 33/10; A61L 33/113
USPC ....... 351/87, 88, 158, 159.03, 209; 345/7, 8, 345/67, 103, 156, 173, 174, 633; 359/266, 295, 630, 632; 600/547; 703/2
See application file for complete search history.

(56) References Cited

U.S. PATENT DOCUMENTS

| | | | |
|---|---|---|---|
| 2012/0056847 | A1 | 3/2012 | Milford |
| 2013/0324881 | A1* | 12/2013 | Kanoh .................. A61B 3/10 600/547 |
| 2014/0152444 | A1* | 6/2014 | Lee ...................... G08B 21/06 340/575 |

FOREIGN PATENT DOCUMENTS

| | | |
|---|---|---|
| JP | 2013-244370 A | 12/2013 |
| WO | WO 2012/011893 A1 | 1/2013 |

OTHER PUBLICATIONS

Hiroyuki Manabe et al., "Using Earphones to Perform Gaze Detection for Wearable Interfaces," NTT DOCOMO Technical Journal, published Oct. 2010, vol. 18, No. 3, pp. 13-17, https://www.nttdocomo.co.jp/binary/pdf/corporate/technology/rd/technical_journal/bn/vol18_3/vol18_3_013jp.pdf.

* cited by examiner

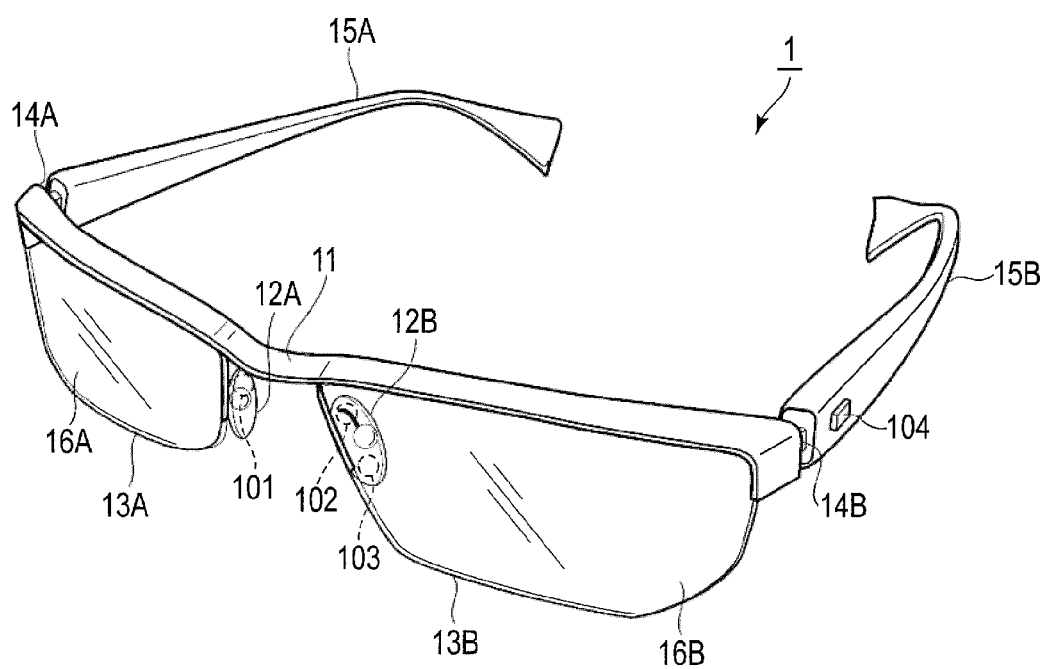
F I G. 1

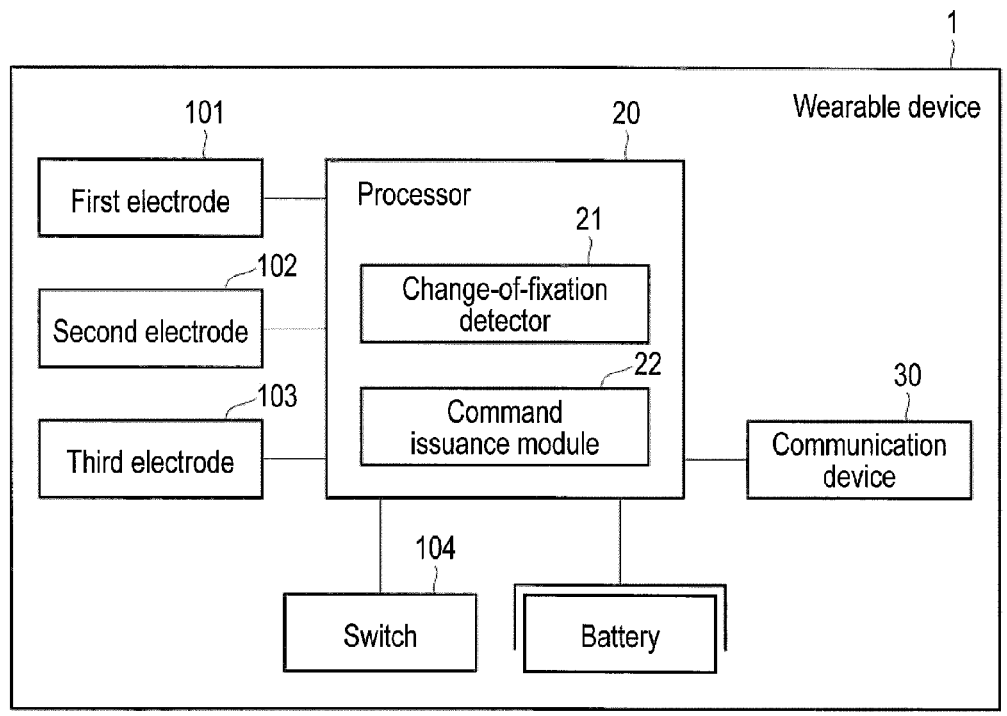
F I G. 2
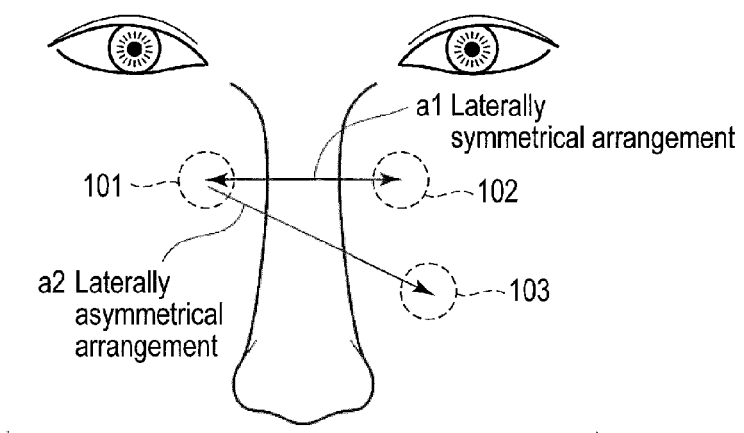
F I G. 3

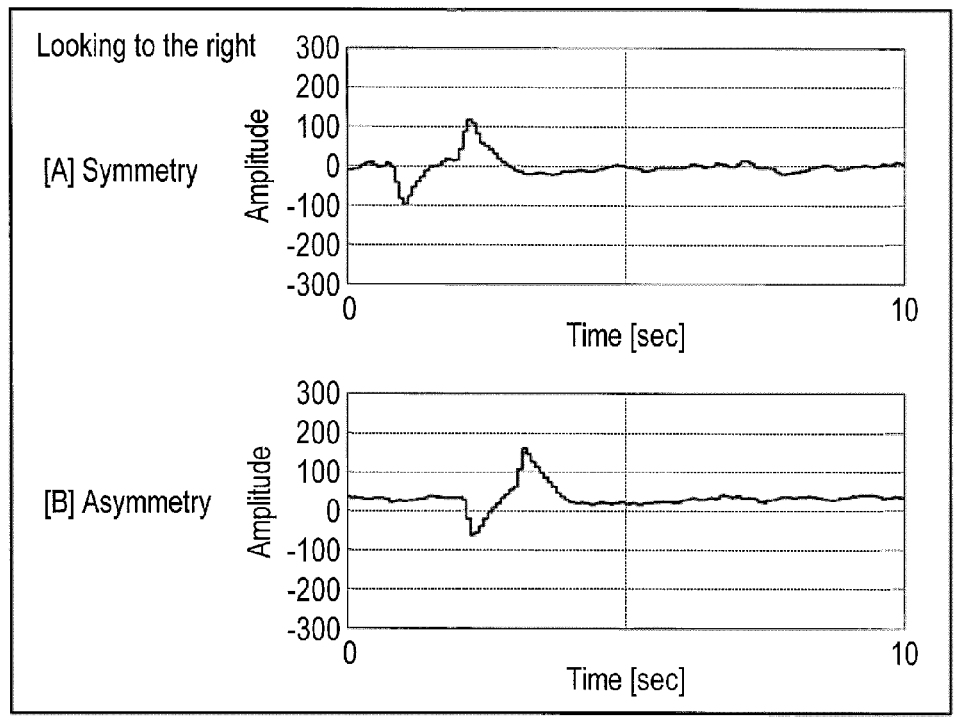
F I G. 5
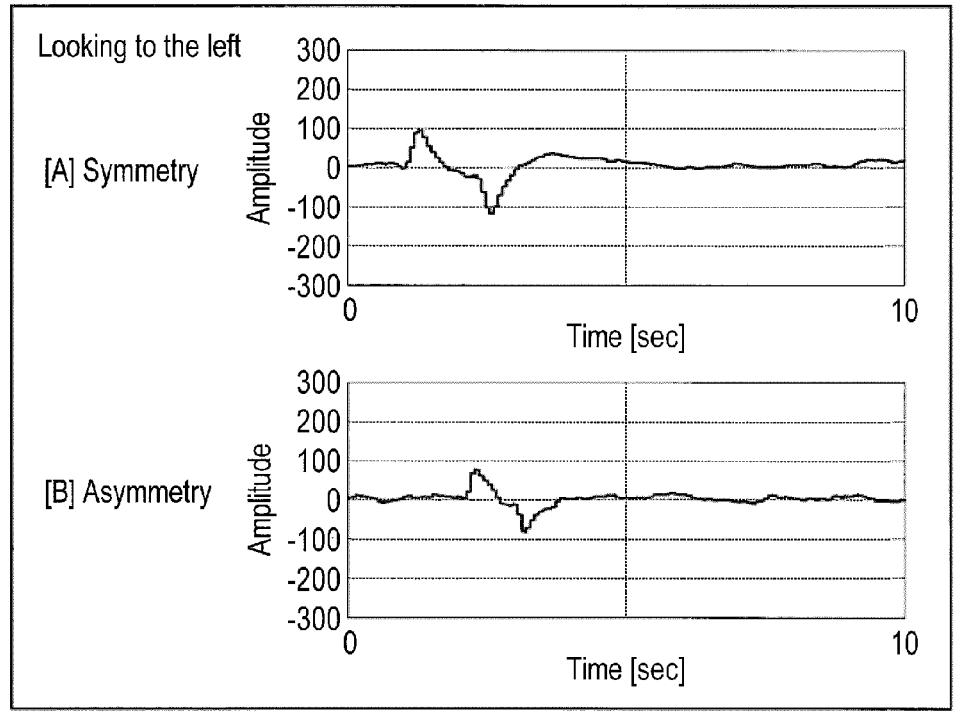
F I G. 6

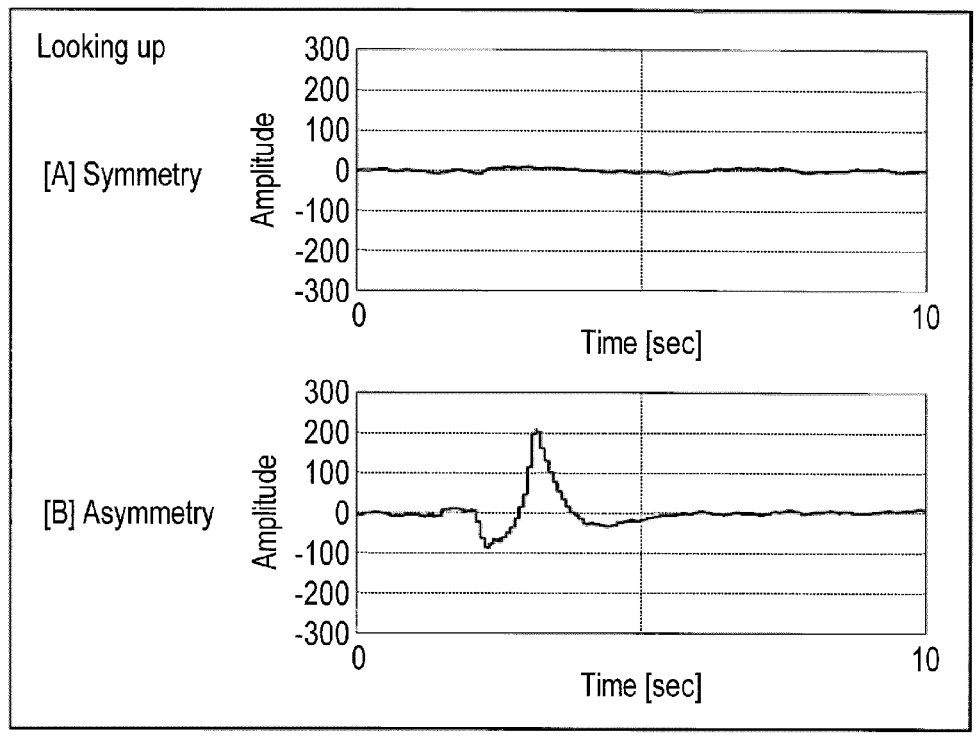
F I G. 7
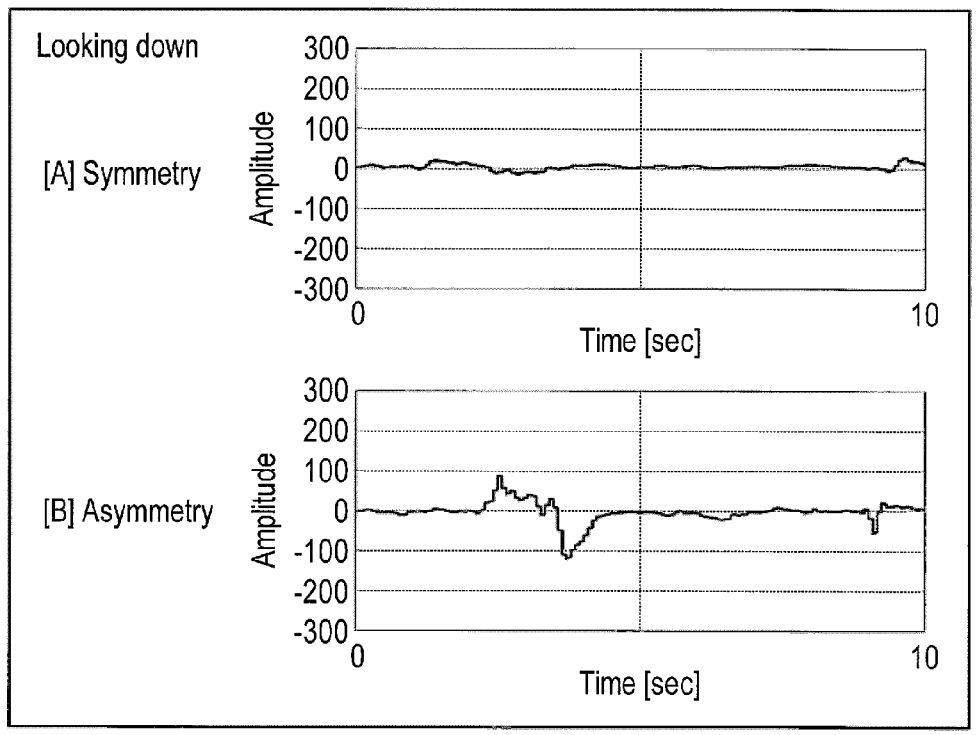
F I G. 8

| Laterally symmetrical arrangement | Laterally asymmetrical arrangement | Determination |
|---|---|---|
| × | × | No movement |
| ○ | × | – |
| × | ○ | Vertical movement |
| ○ | ○ | Horizontal movement |

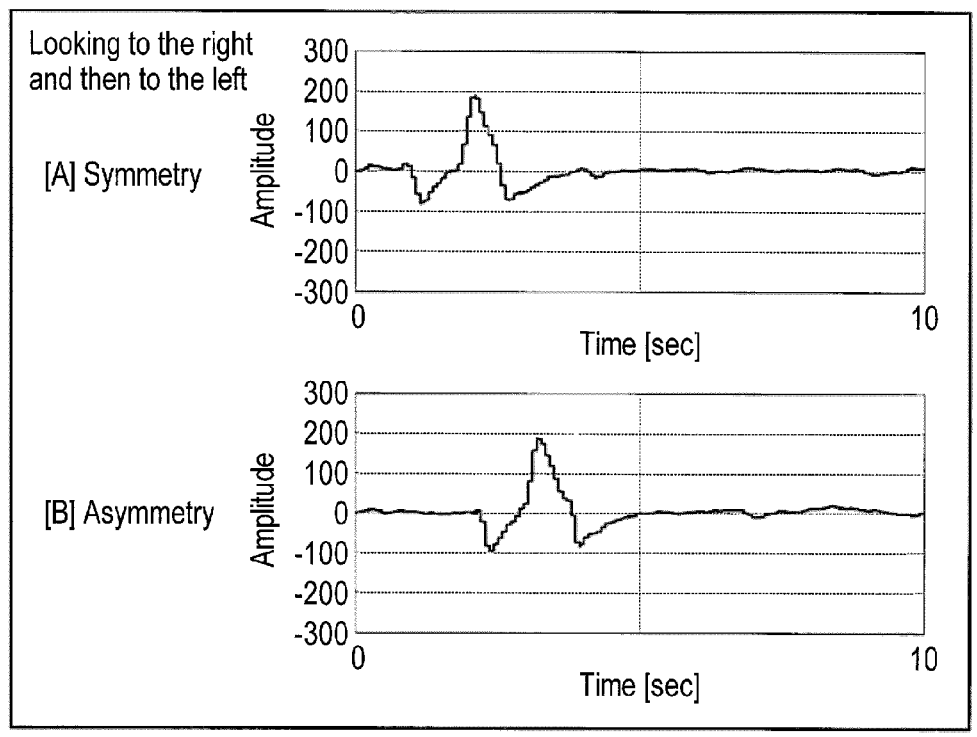
F I G. 10
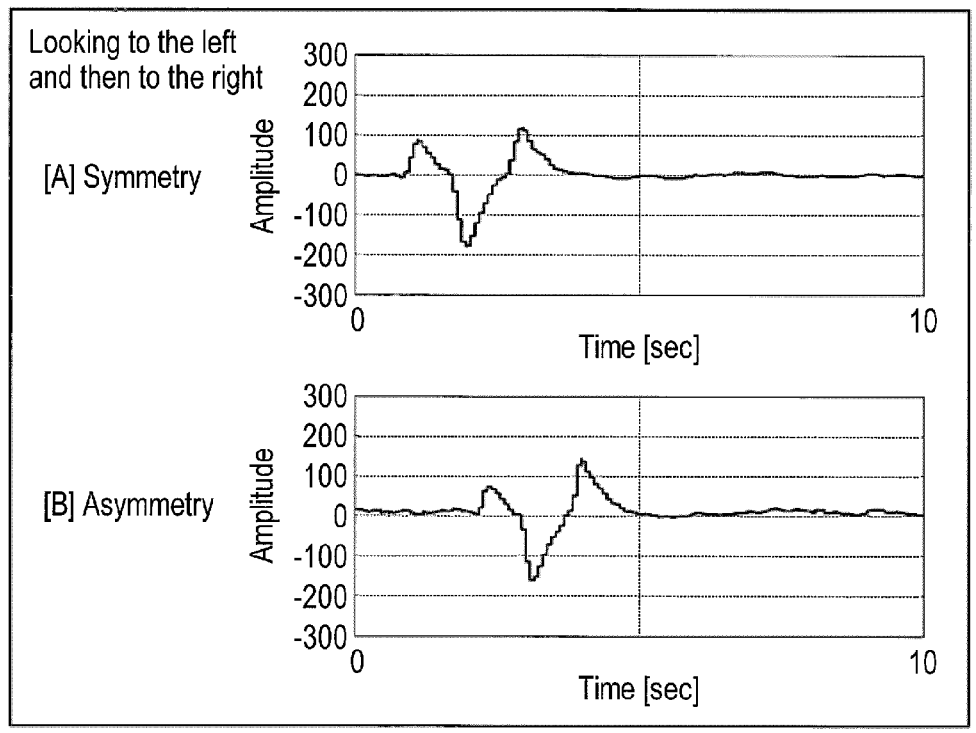
F I G. 11

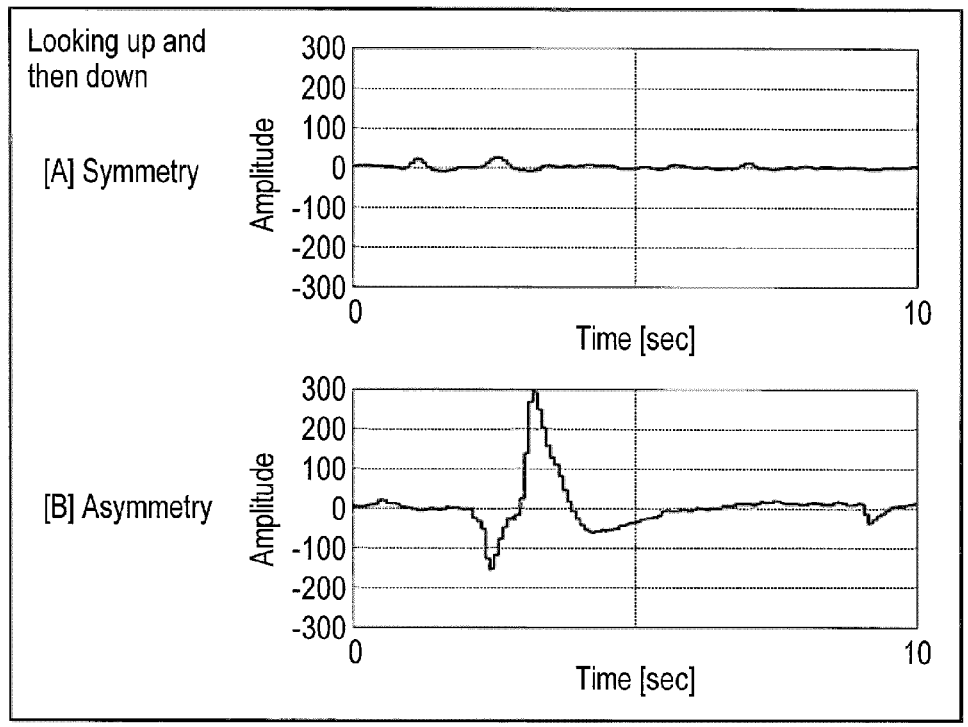
F I G. 12
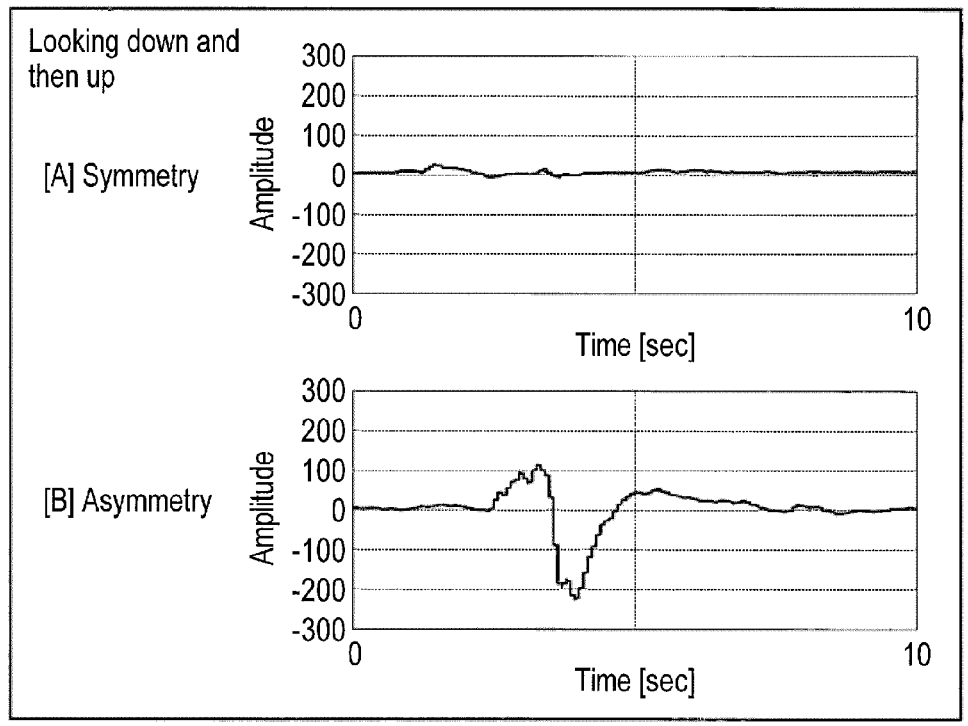
F I G. 13

| Command to be issued | Change-of-fixation pattern |
|---|---|
| Command 1 | Looking ahead → looking to upper left → pausing for 0.5 seconds → looking to lower right → pausing for 0.5 seconds |
| Command 2 | Looking ahead → looking directly above → pausing for 0.5 seconds → looking directly below → pausing for 0.5 seconds |
| Command 3 | Looking ahead → looking to upper right → pausing for 0.5 seconds → looking to lower left → pausing for 0.5 seconds |
| Command 4 | Looking ahead → looking directly to right → pausing for 0.5 seconds → looking directly to left → pausing for 0.5 seconds |
| Command 5 | Looking ahead → looking to lower right → pausing for 0.5 seconds → looking to upper left → pausing for 0.5 seconds |
| Command 6 | Looking ahead → looking directly below → pausing for 0.5 seconds → looking directly above → pausing for 0.5 seconds |
| Command 7 | Looking ahead → looking to lower left → pausing for 0.5 seconds → looking to upper right → pausing for 0.5 seconds |
| Command 8 | Looking ahead → looking directly to left → pausing for 0.5 seconds → looking directly to right → pausing for 0.5 seconds |

F I G. 15

| Upper left | Above | Upper right |
| --- | --- | --- |
| Left | Center (Front) | Right |
| Lower left | Below | Lower right |
F I G. 16
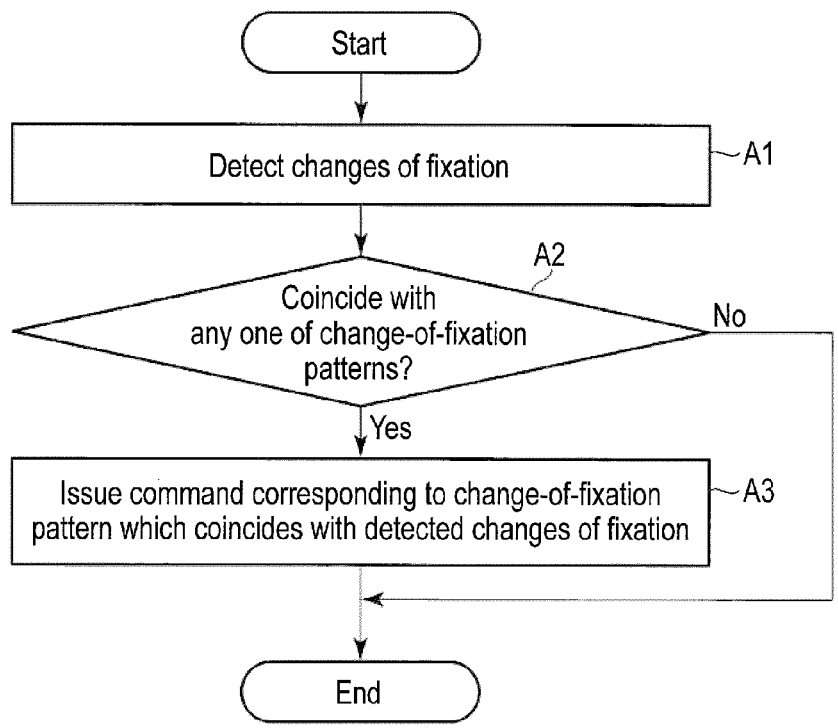
F I G. 17

ELECTRONIC DEVICE, METHOD AND STORAGE MEDIUM

CROSS-REFERENCE TO RELATED APPLICATIONS

This application claims the benefit of U.S. Provisional Application No. 62/076,304, filed Nov. 6, 2014, the entire contents of which are incorporated herein by reference.

FIELD

Embodiments described herein relate generally to an electronic device, a method and a storage medium.

BACKGROUND

Recently, various wearable electronic devices have been developed. Being in contact with the body, most wearable devices include functionality for acquiring motor data (biological data) related to movements of the wearer. For example, among eye-worn devices resembling spectacles, there are those configured to acquire motor data related to changes of eye fixation (eyeball movement).

An eye-worn device configured to acquire change-of-fixation data as motor data is generally configured to detect a change of fixation with an electrode for measuring the ocular potentials provided in the nose pads and the bridge. However, in comparison with normal spectacles for vision correction, since the eye-worn device requires the user to contact the forehead with the bridge provided with an electrode, the user is put under a greater strain while wearing it.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing an example of an exterior appearance of an electronic device of an embodiment.

FIG. 2 is an exemplary diagram showing a system configuration of the electronic device of the embodiment.

FIG. 3 is an exemplary diagram for explaining an example of positional relationships between electrodes in the electronic device of the embodiment.

FIG. 5 is an exemplary diagram showing an example of the waveforms of the ocular potentials detected by the electronic device of the embodiment when the fixation moves to the right.

FIG. 6 is an exemplary diagram showing an example of the waveforms of the ocular potentials detected by the electronic device of the embodiment when the fixation moves to the left.

FIG. 7 is an exemplary diagram showing an example of the waveforms of the ocular potentials detected by the electronic device of the embodiment when the fixation moves up.

FIG. 8 is an exemplary diagram showing an example of the waveforms of the ocular potentials detected by the electronic device of the embodiment when the fixation moves down.

FIG. 10 is an exemplary diagram showing an example of the waveforms of the ocular potentials detected by the electronic device of the embodiment when the fixation moves to the right and then to the left.

FIG. 11 is an exemplary diagram showing an example of the waveforms of the ocular potentials detected by the electronic device of the embodiment when the fixation moves to the left and then to the right.

FIG. 12 is an exemplary diagram showing an example of the waveforms of the ocular potentials detected by the electronic device of the embodiment when the fixation moves up and then down.

FIG. 13 is an exemplary diagram showing an example of the waveforms of the ocular potentials detected by the electronic device of the embodiment when the fixation moves down and then up.

FIG. 15 is an exemplary diagram showing an example of the association between a command to be issued and a change of fixation pattern applied to the electronic device of the embodiment.

FIG. 16 is an exemplary diagram for explaining a modified example of the association between a command to be issued and a change of fixation pattern applicable to the electronic device of the embodiment.

FIG. 17 is an exemplary flowchart showing an example of a procedure of the electronic device of the embodiment.

DETAILED DESCRIPTION

Figure 4:
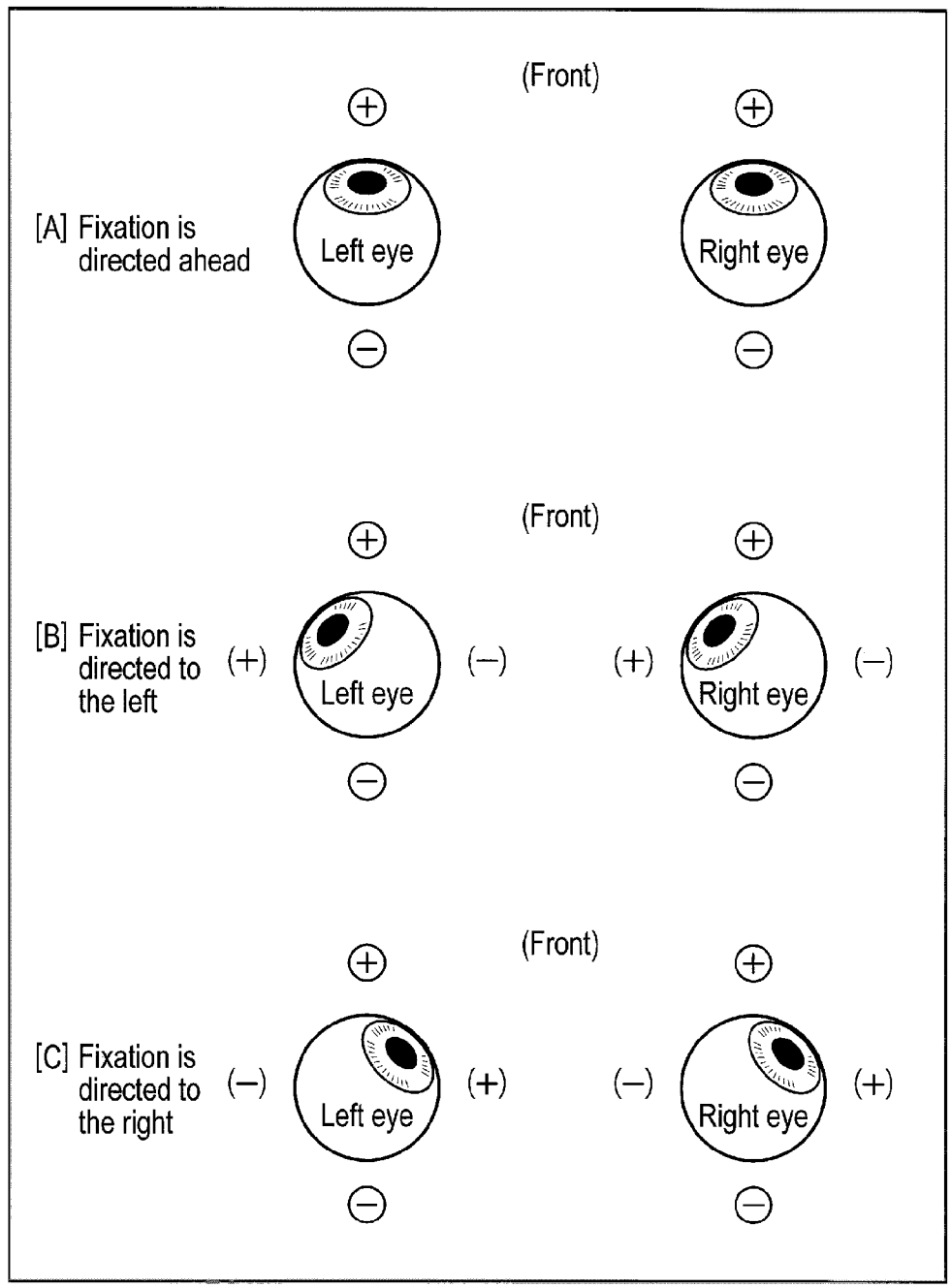
FIG. 4 is an exemplary diagram for explaining a relationship between a change of fixation (eyeball movement) and a change in the ocular potentials.

Various embodiments will be described hereinafter with reference to the accompanying drawings.

In general, according to one embodiment, an eye-worn electronic device comprises a first nose pad, a first electrode, a second nose pad, a second electrode and a third electrode. The first electrode is on the first nose pad. The second electrode is on the second nose pad. The first electrode and the second electrode are in a first straight line extending in a first direction and are used for measuring first ocular potentials in the first direction. The third electrode is on the second nose pad and is at a position distance away from the first straight line. The first electrode and the third electrode are in a second straight line extending in a second direction different from the first direction and are used for measuring second ocular potentials in the second direction.

FIG. 1 is an exemplary diagram showing an example of an exterior appearance of the electronic device of the present embodiment. As shown in FIG. 1, the electronic device may be realized as an eye-worn device 1. The eye-worn device 1 comprises a bridge 11, nose pads 12A and 12B, limbs 13A and 13B, hinges 14A and 14B, temples 15A and 15B, and lenses 16A and 16B. There are some cases where the bridge 11, limbs 13A and 13B, hinges 14A and 14B and temples 15A and 15B (as well as nose pads 12A and 12B in some cases) are collectively called as frames or the like.

At one end of each of the limbs 13A and 13B surrounding the lenses 16A and 16B, the nose pads 12A and 12B are attached in such a manner as to sandwich the user's nose from both sides in order to secure the eye-worn device 1. Further, the limbs 13A and 13B are connected to the bridge 11. The limbs 13A and 13B and the temples 15A and 14B are connected by the hinges 14A and 14B. With the hinges 14A and 14B, the sidepieces of the eye-worn device 1 can be folded.

The eye-worn device 1 is configured to acquire data of a change of fixation as one item of motor data. More specifically, the ocular potentials are measured, and based on a change in the ocular potentials, a change of fixation is detected. As the electrodes for measuring the ocular potentials, the eye-worn device 1 comprises a first electrode 101, a second electrode 102 and a third electrode 103. In the eye-worn device 1, the first electrode 101 is provided on the surface of the nose pad 12A, and the second electrode 102 and the third electrode 103 are provided on the surface of the nose pad 12B. The positional relationships between the electrodes will be described later.

That is, in the eye-worn device 1, the electrodes for measuring the ocular potentials are provided only on the surfaces of the nose pads, which are inevitably contacting the skin (of the nose) of the user, and for example, there is no need to contact the forehead with the bridge, and thus it is possible to reduce the strain put on the user while the user is wearing it. The principle of detecting a change of fixation of the user of the eye-worn device with the first electrode 102, the second electrode 102 and the third electrode 103 provided in the nose pads 12A and 12B will now be described below. Note that the following descriptions are given that one electrode is provided in the nose pad 12A and two electrodes are provided in the nose pad 12B, but needless to say, it is also possible to provide two electrodes in the nose pad 12A and one electrode in the nose pad 12B. Further, a switch 104 for powering on and off the eye-worn device 1 is provided, for example, on the side surface of the temple 15B or the like.

FIG. 2 is an exemplary diagram showing an example of a system configuration of the eye-worn device 1. As shown in FIG. 2, the eye-worn device 1 comprises a processor 20 and a communication device 30 in addition to the first electrode 101, second electrode 102, third electrode 103 and switch 104 shown in FIG. 1. Further, the eye-worn device 1 can accommodate a replaceable battery in the frames. Furthermore, the eye-worn device 1 may comprise a projector for projecting an image on the lens 16A and the lens 16B. With the projector, an image can be displayed in such a manner as to overlap with the real-life image viewed through the lens 16A and the lens 16B, that is, the so-called augmented reality (AR) display can be performed. Some or all of the processor 20, the communication device 30, the battery and the projector may be provided in an expansion unit removable from the frames.

The processor 20 comprises a change-of-fixation detector 21 and a command issuance module 22. The change-of-fixation detector 21 is a module which detects the change of fixation of the user of the eye-worn device 1 by using the first electrode 101, the second electrode 102 and the third electrode 103. The command issuance module 22 is a module which issues various commands for, for example, an external device connected via the communication device 30 based on the detection result by the change-of-fixation detector 21. Therefore, the eye-worn device 1 can serve as a user interface of the external device. The command issued by the command issuance module 22 may be directed to the eye-worn device 1 itself. That is, the eye-worn device 1 may be, for example, an electronic device which operates under a stand-alone environment while performing screen display by the above-described projector or may be an electronic device which operates as a peripheral device of an external device.

The processor 20 may be realized as software by executing a program stored in a memory by a processor or may be realized as hardware by an electronic circuit (including firmware). The processor 20 comprises a function of powering on and off the eye-worn device 1 based on the operation of the switch 104.

The communication device 30 is a module which executes wireless communication conforming to, for example, the IEEE 802.11a/b/g standard. Here, the following descriptions are based on the assumption that the eye-worn device 1 establishes wireless communication with an external device via the communication device 30, but it is also possible to perform wired connection with the external device, for example, by using a cord. In that case, it is possible to configure the eye-worn device 1 to receive power from the external device via the cord instead of accommodating a battery, for example, in the frames. Further, it is possible to move some or all the functions of the processing module 20 from the eye-worn device 1 to the external device regardless of whether the connection established therebetween is wireless or wired.

Next, with reference to FIG. 3, an example of the positional relationships between the electrodes in the eye-worn device 1 will be described.

As shown in FIG. 3, in the eye-worn device 1, firstly, the first electrode 101 is provided on the surface of the nose pad 12A and the second electrode 102 is provided on the surface of the nose pad 12B in such a manner that the first electrode 101 and the second electrode 102 are laterally symmetrical (a1 in FIG. 3). Note that this laterally symmetrical arrangement means to arrange them in the same straight line extending in the horizontal direction (first direction) and does not necessarily mean to arrange them, for example, at the same distance from the midpoint between the nose pads 12A and 12B. Secondly, the third electrode 103 is provided on the surface of the nose pad 12B in such a manner that the first electrode 101 and the third electrode 103 are laterally asymmetrical (a2 in FIG. 3). Here, the laterally asymmetrical arrangement means to arrange the other electrode to be shifted in the vertical direction (second direction) from the straight line extending in the horizontal direction and passing through one electrode, and does not necessarily mean to arrange them, for example, at different distances from the midpoint between the nose pads 12A and 12B.

Further, the following descriptions are given that the third electrode 103 is located below the second electrode 102, but it is also possible to locate the third electrode 103 above the second electrode 102 such that the first electrode 101 and the third electrode 103 becomes laterally asymmetrical.

With reference to FIG. 4, the relationship between a change of fixation (eyeball movement) and a change in the ocular potentials will be described.

In an eyeball, the cornea side bears a positive (+) potential and the retina side bears a negative (−) potential ([A] in FIG. 4). Therefore, when the fixation moves to the left or to the right (when the eyeballs rotate in the horizontal direction), the potential gradient in the vicinity of the eyeballs changes ([B] and [C] in FIG. 4). Further, although not shown in FIG. 4, when the fixation moves up or down (when the eyeballs rotate in the vertical direction), the potential gradient in the vicinity of the eyeballs also changes. The change-of-fixation detector 21 detects a change of fixation of the user of the eye-worn device 1 based on such changes.

More specifically, the change-of-fixation detector 21 firstly measures the ocular potentials (potential difference between the first electrode 101 and the second electrode 102) with the first electrode 101 and the second electrode 102 arranged in such a manner as to be laterally symmetrical. Further, the change-of-fixation detector 21 secondly measures the ocular potentials (potential difference between the first electrode 101 and the third electrode 103) with the first electrode 101 and the third electrode 103 arranged in such a manner as to be laterally asymmetrical. Then, the change-of-fixation detector 21 detects the change of fixation of the user of the eye-worn device 1 based on changes in them.

FIG. 5, FIG. 6, FIG. 7 and FIG. 8 show the waveforms of the ocular potentials which are measured by the change-of-fixation detector 21 when the fixation moves in various directions.

FIG. 5 shows an example of the waveforms of the ocular potentials detected by the change-of-fixation detector 21 when the user of the eye-worn device 1 moves their fixation to the right (the nose pad 12A side). [A] shows a waveform of the ocular potentials measured with the laterally symmetrical first electrode 101 and second electrode 102, and the waveform is formed by chronologically recording changes in the potential difference (AC component) between the first electrode 101 and the second electrode 102 when the first electrode 101 is used as a reference. [B] shows a waveform of the ocular potentials measured with the laterally asymmetrical first electrode 101 and third electrode 103, and the waveform is formed by chronologically recording changes in the potential difference between the first electrode 101 and the third electrode 103 when the first electrode 101 is used as a reference. The waveforms of [A] and [B] in FIG. 6, FIG. 7 and FIG. 8 are similar to those of the above, and the waveforms of [A] and [B] in FIG. 10, FIG. 11, FIG. 12 and FIG. 13, which will be described later, are similar to those of the above as well.

As described above, in an eyeball, the cornea side bears a positive electrode and the retina side bears a negative potential. Therefore, when the fixation moves to the right, the potential of the second electrode 102 becomes negative with respect to the first electrode 101. Since there is a difference in horizontal position between the first electrode 101 and the third electrode 103, when the fixation moves to the right, the potential of the third electrode 103 becomes negative with respect to the first electrode. As a result, as shown in FIG. 5, both [A] and [B] show a waveform of a potential deflected to the negative side.

FIG. 6 shows an example of the waveforms of the ocular potentials detected by the change-of-fixation detector 21 when the user of the eye-worn device 1 moves their fixation to the left (the nose pad 12B side).

When the fixation moves to the left, the potential of the second electrode 102 becomes positive with respect to the first electrode 101. Further, the third electrode 103 becomes positive as well with respect to the first electrode 101. As a result, as shown in FIG. 6, both [A] and [B] show a waveform of a potential deflected to the positive side.

FIG. 7 shows an example of the waveforms of the ocular potentials detected by the change-of-fixation detector 21 when the user of the eye-worn device 1 moves their fixation up.

Since there is no difference in vertical position between the laterally symmetrical first electrode 101 and second electrode 102, when the fixation moves up, there is hardly any change in the potentials ([A] in FIG. 7). On the other hand, since there is a difference in vertical position between the laterally asymmetrical first electrode 101 and third electrode 103 (here, the third electrode 103 is located below), when the fixation moves up, the potential of the third electrode 103 becomes negative with respect to the first electrode 101. As a result, a waveform of a potential deflected to the negative side is produced ([B] in FIG. 7).

FIG. 8 shows an example of the waveforms of the ocular potentials detected by the change-of-fixation detector 21 when the user of the eye-worn device 1 moves their fixation down.

When the fixation moves down, there is hardly any change in the potentials measured in the first electrode 101 and the second electrode 102 which are laterally symmetrical and have no difference in vertical position therebetween ([A] in FIG. 8). On the other hand, in the first electrode 101 and the third electrode 103 which are laterally asymmetrical and have a difference in vertical position, when the fixation moves down, the potential of the third electrode 103 becomes positive with respect to the first electrode 101. As a result, a waveform of a potential deflected to the positive side is produced ([B] in FIG. 8).

In this way, when the fixation of the user of the eye-worn device 1 moves horizontally, as shown in FIG. 5 and FIG. 6, changes occur in both the ocular potentials measured in the laterally symmetrical first electrode 101 and second electrode 102 and the ocular potentials measured in the laterally asymmetrical first electrode 101 and third electrode 103. On the other hand, when the fixation moves vertically, as shown in FIG. 7 and FIG. 8, a change occurs only in the ocular potentials measured in the laterally asymmetrical first electrode 101 and third electrode 103. Further, as to the waveforms, the waveform of a case where the fixation moves up is in the same shape as that of a case where the fixation moves to the right, and the waveform of a case where the fixation moves down is in the same shape as that of a case where the fixation moves to the left. Therefore, when a change of fixation is to be detected, the change-of-fixation detector 21 applies, for example, the determination logic shown in FIG. 9.

To explain while paying attention to the ocular potentials measured in the laterally asymmetrical first electrode 101 and third electrode 103, when changes occur in the ocular potentials measured in the laterally asymmetrical first electrode 101 and third electrode 103 and if no change occurs in the ocular potentials measured in the laterally symmetrical first electrode 101 and second electrode 102, the change-of-fixation detector 21 regards this as a change of fixation in the vertical direction, thereby detecting a change of fixation. On the other hand, when a change also occurs in the ocular potentials measured in the laterally symmetrical first electrode 101 and second electrode 102, the change-of-fixation detector 21 regards this as a change of fixation in the horizontal direction, thereby detecting a change of fixation.

In this way, the change-of-fixation detector 21 can detect vertical and horizontal changes of fixation of the user of the eye-worn device 1. Note that it is also possible to configure the change-of-fixation detector 21 to share an analog front-end of a single channel between two channels by using the time division technique to acquire the potential difference of these channels in order to simplify the system, reduce the mounting area, reduce the power consumption and the like.

FIG. 5, FIG. 6, FIG. 7 and FIG. 8 show the waveforms of the ocular potentials of a case where the user of the eye-worn device 1 makes a single change of fixation in various directions. Next, the waveforms of the ocular potentials of a case where the user of the eye-worn device 1 makes changes of fixation continuously, for example, to the right and then to the left or the like will be described with reference to FIG. 10, FIG. 11, FIG. 12 and FIG. 13.

FIG. 10 shows an example of the waveforms of the ocular potentials detected by the change-of-fixation detector 21 when the user of the eye-worn device 1 moves their fixation to the right and then to the left.

As described above, when the fixation moves to the right, the potential of the second electrode 102 becomes negative with respect to the first electrode 101, and since the potential of the third electrode 103 becomes negative with respect to the first electrode 101 as well, both [A] and [B] show a waveform of a potential deflected to the negative side (see also FIG. 5). On the other hand, when the fixation moves to the left, the potential of the second electrode 102 becomes positive with respect to the first electrode 101, and since the potential of the third electrode 103 becomes positive with respect to the first electrode 101 as well, both [A] and [B] show a waveform of a potential deflected to the positive side (see also FIG. 6). When the fixation moves to the right and then to the left, as shown in FIG. 10, the waveforms of the potentials are more greatly deflected to the positive side, and thus the change-of-fixation detector 21 can detect the change of fixation to the left which is made immediately after the change of fixation to the right.

FIG. 11 shows an example of the waveforms of the ocular potentials detected by the change-of-fixation detector 21 when the user of the eye-worn device 1 moves their fixation to the left and then to the right.

When the fixation moves to the left and then to the right, in contrast to a case where the fixation moves to the right and then to the left, as shown in FIG. 11, the waveforms of the potentials are more greatly deflected to the negative side. In this way, the change-of-fixation detector 21 can detect the change of fixation to the right which is made immediately after the change of fixation to the left.

FIG. 12 shows an example of the waveforms of the ocular potentials detected by the change-of-fixation detector 21 when the user of the eye-worn device 1 moves their fixation up and then down.

As described above, when the fixation moves up, the potential of the third electrode 103 becomes positive with respect to the first electrode 101, and only [B] shows a waveform of a potential deflected to the positive side (see also FIG. 7). On the other hand, when the fixation moves down, the potential of the third electrode 103 becomes positive with respect to the first electrode 101, and only [B] shows a waveform of a potential deflected to the positive side (see also FIG. 8). When the fixation moves up and then down, as shown in FIG. 12, a waveform of a potential is more greatly deflected to the positive side, and thus the change-of-fixation detector 21 can detect the downward movement of the fixation which is made immediately after the upward movement of the fixation.

FIG. 13 shows an example of the waveforms of the ocular potentials detected by the change-of-fixation detector 21 when the user of the eye-worn device 1 moves their fixation down and then up.

When the fixation moves down and then up, in contrast to a case where the fixation moves up and then down, as shown in FIG. 13, a waveform of a potential is more greatly deflected to the positive side. In this way, the change-of-fixation detector 21 can detect the upward movement of the fixation which is made immediately after the downward movement of the fixation.

In this way, even when the fixation of the user of the eye-worn device 1 is continuously moved, the change-of-fixation detector 21 can detect various movement directions.

Note that, a case where the change-of-fixation detector 21 measures the potential difference between the first electrode 101 and the second electrode 102 and the potential difference between the first electrode 101 and the third electrode 103 has been described. In place of this, it is also possible to configure the change-of-fixation detector 21 to measure the potential difference between the first electrode 101 and the second electrode 102 and the potential difference between the second electrode 102 and the third electrode 103 (which are laterally asymmetrical).

Further, for example, it is possible to provide a fourth electrode in the nose pad 12A, which is provided with the first electrode 101, in order to improve the detection accuracy of the change-of-fixation detector 21. More specifically, for example, by arranging the fourth electrode with the third electrode 103 in the same straight line extending in the horizontal direction, either one or both of the potential difference of the third electrode 103 and the fourth electrode (which are laterally symmetrical) and the potential difference between the second electrode and the fourth electrode (which are laterally asymmetrical) may be measured. It is certainly possible to further add a fifth electrode and a sixth electrode. By arranging electrodes in such a manner as to form an array, it becomes possible to reduce random noise by taking samples in a plurality of positions and using the average of these samples.

Note that the ocular potentials measured in the laterally asymmetrical first electrode 101 and the third electrode 103 include a horizontal potential difference and a vertical potential difference. Based on this point, it is also possible to configure the change-of-fixation detector 21 to detect a change of fixation, for example, by using a following procedure instead of applying the determination logic of FIG. 9.

Figures 9, 14:
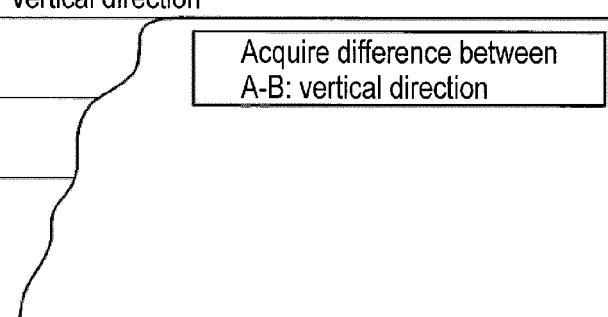
FIG. 9 is an exemplary diagram showing an example of logic of determining the direction of a change of fixation applied to the electronic device of the embodiment.
FIG. 14 is an exemplary diagram for explaining a modified example of a procedure for detecting a change of fixation applicable to the electronic device of the embodiment.

Now, the following descriptions are based on the assumption that the change-of-fixation detector 21 shares an analog front-end of a single channel between two channels by using time division technique to acquire the potential difference of these channels as described above. In FIG. 14, "A" indicates a section in which the potential difference between the laterally symmetrical first electrode 101 and the second electrode 102 is measured, and "B" indicates a section in which the potential difference between the laterally asymmetrical first electrode 101 and third electrode 103 is measured. As shown in FIG. 14, the change-of-fixation detector 21 measures two potential differences alternately. When the second potential difference, that is, the potential difference between the laterally asymmetrical first electrode 101 and third electrode 103 is measured, the change-of-fixation detector 21 calculates the difference between the value of the second potential difference and the value of the first potential difference, that is, the potential difference between the laterally symmetrical first electrode 101 and second electrode 102. The calculated value is a vertical potential difference. By acquiring the horizontal potential difference and the vertical potential difference, the change-of-fixation detector 21 can detect not only vertical and horizontal changes of fixation but also changes of fixation in an oblique direction such as in the upper-leftward or the lower-rightward direction.

In this way, the eye-worn device 1 can measure the ocular potentials only with the electrodes provided on the surfaces of the nose pads, which inevitably contact the skin of (the nose of) the user, and does not require the user to contact, for example, the bridge with the forehead, thereby realizing reduction of the strain put on the user while the user is wearing it.

Next, the principle of operating the command issuance module 22 which issues various commands for, for example, an external device connected via the communication device

30 based on the detection result of the change-of-fixation detector 21 will be described.

When various commands are to be issued on the basis of the detection results by the change-of-fixation detector 21, that is, changes of fixation, the eye-worn device 1 is configured to firstly set the direction of fixation at the start of command issuance directly ahead (center of the field of view), in order to equalize the response of the change-of-fixation detector 21 to changes of fixation in various directions. When the above-described projector is provided therein, it is possible to perform AR display in order to direct fixation to the front. In this way, the positions of the pupils are adjusted to be in the center of the movable range of the eyeballs. Generally, in daily life, people are more likely to look down than ahead. If this state is set to as the starting point, in the case of a vertical change of fixation, the response of the change-of-fixation detector 21 is high when the fixation moves up while the response of the change-of-fixation detector 21 is low when the fixation moves down. By configuring the eye-worn device 1 to set the direction of fixation directly ahead (center of the field of view) at the start of command issuance, it is possible to reduce such unevenness in the response of the change-of-fixation detector 21.

Further, the eye-worn device 1 is configured to secondly associate change-of-fixation patterns (eyeball movement patterns) which will not likely be made in daily life with commands in order to prevent erroneous command issuance. For example, the number of times of turning the eyes in a different direction, the period of keeping the eyes in one direction and the like are defined.

FIG. 15 shows an example of the association between a command to be issued and a change-of-fixation pattern. In the example of FIG. 15, eight commands can be issued by performing a series of movements of (a) looking ahead, (b) looking in any one of eight vertical, horizontal and oblique directions, (c) pausing for 0.5 seconds or more, (d) looking in the direction symmetrical with respect to the front, and (d) pausing for 0.5 seconds or more. Here, pausing for 0.5 seconds or more, for example, in a case where the user looks up in (b), typically means to maintain the state for 0.5 seconds or more. However, it is also possible to include such a case where the time passed from when the user starts to look up and to when the user looks in the direction symmetrical with respect to the front in (d), that is, to when the user looks down, is 0.5 seconds or more (there may be a pause for less than 0.5 second or may be no pause).

Let us consider now the case where such a change-of-fixation pattern as to move the fixation in a certain direction and then in the direction symmetrical with respect to the front is adopted. Here, if the above-described projector is provided, the user can issue an intended command even though the user does not remember the meanings associated with respective directions by, for example, performing such AR display as to show the meanings associated with respective directions of changes of fixation possibly made at the start (from a state where the fixation is directed to the front).

When receiving the detection result of the change-of-fixation detector 21, the command issuance module 22 checks whether there is a change-of-fixation pattern identical with the detection result. If there is one, the command issuance module 22 issues the command associated with the change-of-fixation pattern.

Note that the above-described eight commands are the maximum number of commands which the command issuance module 22 can issue merely under a certain condition and does not mean the total number of commands which the command issuance module 22 in the eye-worn device 1 can issue.

Further, the following descriptions are based on the assumption that the eye-worn device 1 is under such a limited condition where, for example, a certain command has been issued immediately before and an operation of choosing one of a plurality of options is set to be performed after the issuance of the command. Under such a limited condition, the command issuance module 22 does not restrictedly operate based on the above-described change-of-fixation patterns. For example, by dividing the field of view into a 3×3 grid of cells, when a change of fixation in which the user looks ahead at the middle cell and then looks at one of the eight peripheral cells is detected, the command issuance module 22 may issue the command of choosing the option corresponding to the cell.

In this way, the eye-worn device 1 can provide the user interface to issue a command by a change of fixation, which reduces unevenness in the response to the changes of fixation in various directions and is configured in consideration of preventing erroneous command issuance.

FIG. 17 is an exemplary flowchart showing an example of a procedure of the eye-worn device 1.

The change-of-fixation detector 21 measures, by using the first electrode 101, the second electrode 102 and the third electrode 103, the ocular potentials of the user of the eye-worn device 1, and detects, based on changes in the potentials, changes of fixation of the user (block A1). Based on the detection result by the change-of-fixation detector 21, The command issuance module 22 determines whether the detected changes of fixation coincide with any one of the change-of-fixation patterns associated with the commands to be issued (block A2). When these is a change-of-fixation pattern which coincides with the detection result (yes in block A2), the command issuance module 22 issues the command associated with the change pattern (block A3).

As described above, the eye-worn device 1 enables the user to perform hands-free operation on an external device or on the eye-worn device 1 itself.

The operation procedures of embodiments can be realized by software (program), and therefore an effect similar to those produced in the embodiments can be easily realized by installing this software in an ordinary computer via a computer readable storage medium storing this software.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An eye-worn electronic device comprising: a first nose pad; a first electrode on the first nose pad; a second nose pad; a second electrode on the second nose pad, the first electrode and the second electrode in a first straight line extending in a first direction and used for measuring first ocular potentials in the first direction; a third electrode on the second nose pad and at a position distance away from the first straight line, the first electrode and the third electrode in a second straight line extending in a second direction different from the first direction and used for measuring second ocular potentials in the second direction; and a processor configured to detect a first change of fixation in the first direction based on a change in the first ocular potentials, and to detect a second change of fixation in the second direction based on a change in the second ocular potentials, wherein the processor is configured to detect the second change of fixation in the second direction based on whether potential of the third electrode becomes negative with respect to the first electrode or the potential of the third electrode becomes positive with respect to the first electrode.

2. The device of claim 1, further comprising one or more electrodes comprising a fourth electrode in the second straight line extending in the first direction and passing through the third electrode.

3. The device of claim 2, wherein the processor is configured to measure by an array of a plurality of electrodes comprising the first electrode, the second electrode, the third electrode and the fourth electrode, the first ocular potentials and the second ocular potentials respectively in a plurality of positions, and reduce random noise by using respective average values thereof.

4. The device of claim 1, further comprising a processor configured to issue a first command when a first change in ocular potentials corresponding to a change of fixation from a front to a third direction is detected based on the first ocular potentials and/or the second ocular potentials, and to issue a second command different from the first command when a second change in ocular potentials corresponding to a change of fixation from the front to a fourth direction different from the third direction is detected based on the first ocular potentials in the first direction and/or the second ocular potentials in the second direction.

5. The device of claim 1, further comprising a processor configured to issue a first command when a change in ocular potentials corresponding to a change of fixation from a front to a third direction and a change of fixation from the third direction to a fourth direction different from the third direction are detected based on the first ocular potentials and/or the second ocular potentials.

6. The device of claim 1, further comprising a processor configured to issue a first command when a change in ocular potentials corresponding to a change of fixation from a front to a third direction and a change of fixation from the third direction to a fourth direction different from the third direction are detected based on the first ocular potentials and the second ocular potentials, the change of fixation from the third direction to the fourth direction completed in a first period of time after the change of fixation from the front to the third direction.

7. A method of using an eye-worn device, the method comprising:
measuring first ocular potentials in a first direction using a first electrode and a second electrode in a first straight line extending in the first direction, the first electrode on a first nose pad, the second electrode on a second nose pad;
measuring second ocular potentials in a second direction different from the first direction using the first electrode and a third electrode in a second straight line extending in the second direction, the third electrode on the second nose pad and at a position distance away from the first straight line;
detecting a change of fixation in the first direction based on a change in the first ocular potentials; and
detecting a change of fixation in the second direction based on a change in the second ocular potentials, wherein the detecting the change of fixation in the second direction is based on whether potential of the third electrode becomes negative with respect to the first electrode or the potential of the third electrode becomes positive with respect to the first electrode.

8. The method of claim 7, further comprising measuring ocular potentials using one or more electrodes comprising a fourth electrode in the second straight line extending in the first direction and passing through the third electrode.

9. The method of claim 7, further comprising:
issuing a first command when a first change in ocular potentials corresponding to a change of fixation from a front to a third direction is detected based on the first ocular potentials and/or the second ocular potentials; and
issuing a second command different from the first command when a second change in ocular potentials corresponding to a change of fixation from the front to a fourth direction different from the third direction is detected based on at least one of the first ocular potentials and/or the second ocular potentials.

10. The method of claim 7, further comprising issuing a first command when a change in ocular potentials corresponding to a change of fixation from a front to a third direction and a change of fixation from the third direction to a fourth direction different from the third direction are detected based on the first ocular potentials and/or the second ocular potentials.

11. The method of claim 7, further comprising issuing a first command when a change in ocular potentials corresponding to a change of fixation from a front to a third direction and a change of fixation from the third direction to a fourth direction different from the third direction are detected based on the first ocular potentials and the second ocular potentials, the change of fixation from the third direction to the fourth direction completed in a first period of time after the change of fixation from the front to the third direction.

12. A non-transitory computer readable medium having stored thereon a computer program which is executable by a computer, the computer program controlling the computer to execute functions of:
measuring first ocular potentials in a first direction using a first electrode and a second electrode in a first straight line extending in the first direction, the first electrode on a first nose pad included in an eye-worn housing, the second electrode on a second nose pad included in the housing;
measuring second ocular potentials in a second direction different from the first direction using the first electrode and a third electrode in a second straight line extending in the second direction, the third electrode on the second nose pad and at a position distance away from the first straight line;
detecting a change of fixation in the first direction based on a change in the first ocular potentials; and
detecting a change of fixation in the second direction based on a change in the second ocular potentials, wherein the detecting the change of fixation in the second direction is based on whether potential of the third electrode becomes negative with respect to the first electrode or the potential of the third electrode becomes positive with respect to the first electrode.

13. The medium of claim 12, the computer program further controlling the computer to execute functions of measuring ocular potentials using one or more electrodes including a fourth electrode in the second straight line extending in the first direction and passing through the third electrode.

14. The medium of claim 12, the computer program further controlling the computer to execute functions of:
   issuing a first command when a first change in ocular potentials corresponding to a change of fixation from a front to a third direction is detected based on the first ocular potentials and/or the second ocular potentials; and
   issuing a second command different from the first command when a second change in ocular potentials corresponding to a change of fixation from the front to a fourth direction different from the third direction is detected based on the first ocular potentials and/or the second ocular potentials.

15. The medium of claim 12, the computer program further controlling the computer to execute functions of issuing a first command when a change in ocular potentials corresponding to a change of fixation from a front to a third direction and a change of fixation from the third direction to a fourth direction different from the third direction are detected based on the first ocular potentials and/or the second ocular potentials.

16. The medium of claim 12, the computer program further controlling the computer to execute functions of issuing a first command when a change in ocular potentials corresponding to a change of fixation from the front to a third direction and a change of fixation from the third direction to a fourth direction different from the third direction are detected based on the first ocular potentials and/or the second ocular potentials, the change of fixation from the third direction to the fourth direction completed in a first period of time after the change of fixation from the front to the third direction.

* * * * *